US009588820B2

(12) United States Patent
Ravi et al.

(10) Patent No.: US 9,588,820 B2
(45) Date of Patent: Mar. 7, 2017

(54) CLOUD ARCHITECTURE RECOMMENDER SYSTEM USING AUTOMATED WORKLOAD INSTRUMENTATION

(75) Inventors: Kiran V. V. N. Ravi, Belmont, CA (US); Rohit P. Sureka, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 766 days.

(21) Appl. No.: 13/603,167

(22) Filed: Sep. 4, 2012

(65) Prior Publication Data

US 2014/0068053 A1   Mar. 6, 2014

(51) Int. Cl.
*G06F 15/173* (2006.01)
*G06F 9/50* (2006.01)

(52) U.S. Cl.
CPC ...... *G06F 9/5072* (2013.01); *G06F 2209/501* (2013.01)

(58) Field of Classification Search
CPC . G06F 9/5072; G06F 2209/501; G06F 15/173
See application file for complete search history.

(56) References Cited

U.S. PATENT DOCUMENTS

| | | | |
|---|---|---|---|
| 5,848,270 A | 12/1998 | DeLuca et al. | |
| 6,542,854 B2 | 4/2003 | Yang et al. | |
| 7,107,187 B1 * | 9/2006 | Saghier | G06Q 10/06 702/182 |
| 8,572,623 B2 * | 10/2013 | Bhogal | G06F 9/50 718/1 |
| 8,572,626 B2 * | 10/2013 | Van Der Veen | G06F 9/526 711/153 |
| 8,869,157 B2 * | 10/2014 | Raney | G06F 9/5044 718/102 |
| 2002/0099521 A1 * | 7/2002 | Yang | G06F 11/3409 702/186 |
| 2006/0074970 A1 * | 4/2006 | Narayanan | G06F 11/3419 |
| 2008/0010370 A1 * | 1/2008 | Peake | G06F 11/3485 709/223 |

(Continued)

*Primary Examiner* — Moustafa M Meky
*Assistant Examiner* — Kidest Mendaye
(74) *Attorney, Agent, or Firm* — Vista IP Law Group, LLP (57) ABSTRACT

A method, system, and computer program product for of configuring cloud computing platforms. One such method serves for recommending alternative computing architectures for a selected application using automated instrumentation of the application under an abstracted workload. The method commences by measuring workload characteristics of the selected application using pre-determined performance parameters. Additional performance parameters to be measured are selected based on previous measurements, and further analysis includes instrumenting the application to provide measurement instruments corresponding to the respective selected additional performance parameters. Such hardware- or software-based instruments are used for determining a baseline set of performance metrics by measuring the performance of the selected application on a first (e.g., currently-in-use) computing architecture, then, measuring the performance of the application on other proposed computing architectures. Charts and reports are used for comparing the performance of the selected application on the currently-in-use architecture to any of the other proposed computing architectures.

21 Claims, 7 Drawing Sheets

(56) References Cited

U.S. PATENT DOCUMENTS

| | | | |
|---|---|---|---|
| 2010/0268511 A1* | 10/2010 | Kato | G06F 11/3452 702/182 |
| 2011/0271276 A1* | 11/2011 | Ashok | G06F 9/5077 718/1 |
| 2012/0185868 A1* | 7/2012 | Bartfai-Walcott | G06F 9/445 718/105 |
| 2013/0339528 A1* | 12/2013 | Niemoeller | G06F 9/505 709/226 |
| 2014/0047090 A1* | 2/2014 | Livne | H04L 65/1063 709/223 |
| 2014/0047095 A1* | 2/2014 | Breternitz | G06F 9/5072 709/224 |

* cited by examiner

| System/Configuration | Performance Metrics | | | | | |
|---|---|---|---|---|---|---|
| | P(1) | P(2) | P(3) | P(4) | ... | P(N) |
| Configuration A | P1$_A$ | P2$_A$ | P3$_A$ | P4$_A$ | | PN$_A$ |
| Configuration B | P1$_B$ | P2$_B$ | P3$_B$ | P4$_B$ | | PN$_B$ |
| ... | ... | ... | ... | ... | | ... |
| Configuration Z | P1$_Z$ | P2$_Z$ | P3$_Z$ | P4$_Z$ | | PN$_Z$ |

FIG. 7

CLOUD ARCHITECTURE RECOMMENDER SYSTEM USING AUTOMATED WORKLOAD INSTRUMENTATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of configuring computing platforms and more particularly to techniques for recommending alternative cloud architectures using automated workload instrumentation.

BACKGROUND

Some embodiments of the present disclosure are directed to a recommendation system for evaluating alternative cloud architectures using automated workload instrumentation.

Trends in the landscape of computing platforms provides the motivation for such a recommendation system. In the context of a cloud-based platform, often a company subscribing for access to cloud resources might not utilize the full potential of the cloud infrastructure. As an example, some legacy systems administer "pay per use" schemes where the client of the cloud-based platform pays only for the time they use the system. In this case, the server (e.g., a virtual server hosted on the cloud infrastructure) would either be hosting the client's application (e.g., as one or more ready processes) or the client would have to delete the application altogether. In some cases, there is no "suspension" mode where the client is not charged even though interaction with the application is quiescent or minimal. That is, if the customer wants to stop paying for the configured cloud resources, the only option is to suspend the client application, take a snapshot of the application from within the cloud server, store the snapshot, and then delete the process or processes of the client application for a later restoration. In most cases, such a suspend-snapshot-delete-restore is impractical.

As another example a company might initially deploy on a workstation-like (e.g., compute-intensive) configuration, and later discover that database-like operations dominate the computing resource usage. Commercially, this can result in a "pain point" for the client of the cloud resource, namely that the client ends up paying for unused (but configured and available) computing resources while the needed (but under-specified) services are lacking. Of course, the client wants to pay only for the needed (e.g., configured and utilized) resources, and not for unneeded (e.g., configured and underutilized) resources.

Unfortunately, legacy systems for analyzing and configuring computing platforms are deficient in many regards, especially as regards evaluating alternative cloud architectures. For example, earlier attempts were motivated by the high cost of performing in-situ testing, and techniques developed to address this high cost relied on modeling or profiling of a computer system, and/or modeling or profiling a workload rather than employing actual measurement techniques. The models in these legacy systems were often oversimplified, were not tied to any specific hardware implementation, and generally failed to account for the interaction of the many components in a computer system. In the limited cases when performance modeling was used in these legacy systems, they relied on external performance measurement tools in order to calculate a profile of a computing system for use in making system performance predictions and estimations. Worse, the aforementioned legacy techniques failed to refine the models or profiles based on in-situ testing or comparisons. In absence of in-situ measurements, the legacy models or profiles failed to provide good visibility into resource utilization, application performance, and operational health of the platform, and legacy systems failed to offer "comparables" (e.g., comparisons with other similar cloud applications, comparisons against alternative configurations, etc.). Moreover, the aforementioned technologies do not recommend alternative cloud configurations based on automated test measurements. Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for recommending alternative cloud architectures using automated workload instrumentation.

Exemplary embodiments serve for recommending alternative computing architectures for a selected application using automated instrumentation of the application under an automatically-abstracted workload. In a method embodiment, the method commences by measuring workload characteristics of the selected application using pre-determined performance parameters. Additional performance parameters to be measured are selected based on the previous measurements, and further analysis includes instrumenting the application to provide measurement instruments corresponding to the respective selected additional performance parameters. Such hardware- or software-based instruments are used for determining a baseline set of performance metrics by measuring the performance of the selected application on a first (e.g., currently-in-use) computing architecture, then measuring the performance of the application on other proposed computing architectures. Charts and reports are used for comparing the performance of a selected application on the currently-in-use architecture to any of the other proposed computing architectures.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Some embodiments of the present disclosure are directed to an improved approach for implementing recommending alternative cloud architectures using automated workload instrumentation. More particularly, disclosed herein are environments, methods, and systems for implementing recommending alternative cloud architectures using automated workload instrumentation.

OVERVIEW

Legacy systems do not provide system-wide visibility into resource utilization, application performance, and operational health of the cloud configuration. Nor do legacy systems provide empirically ratified comparisons with alternative cloud configurations. And, in some cases, legacy systems do not even measure whether a selected cloud configuration is insufficient, or is sufficient, or can be improved in accordance with some particular recommendation of an alternative configuration.

What is needed is a recommendation that offers alternatives (e.g., alternative cloud architectures and configurations) to more fully utilize the resources available. For instance, a company "A" using two database servers and one middle tier, as a host platform for their application, might not realize that the company is paying for, yet might never use, the power of the two database servers. Or, in a related scenario, the company "A" might not ever realize their application needs more resources in the middle tier (e.g., for better functioning and performance of their application). To improve upon this situation, the herein-disclosed recommendation system can act as a recommender to suggest one or more alternative cloud configurations to achieve a more optimal application deployment.

DEFINITIONS

The term "instrument" refers to any software- or hardware-based measuring tool. An instrument can measure one or more given system parameters (e.g., CPU utilization, packet latency, memory usage, page faults, etc.), and can perform such measurements during the execution and in-situ operation of software (e.g., a software application, a virtual machine, etc.).

The term "instrumentation" refers to any collection of software- or hardware-based measuring instruments. Instrumentation can be applied to a workload (e.g., a producer), and/or to an application (e.g., a consumer). Instrumentation can be implemented on, or in either an application or a workload, or both.

The term "logic" means any combination of software or hardware that is used to implement all or part of the embodiments of the present disclosure.

A "module" includes any mix of any portions of computer memory and any extent of circuitry including circuitry embodied as a processor.

Reference is now made in detail to certain embodiments. The disclosed embodiments are not intended to be limiting of the claims.

DESCRIPTIONS OF EXEMPLARY EMBODIMENTS

Figure 1:
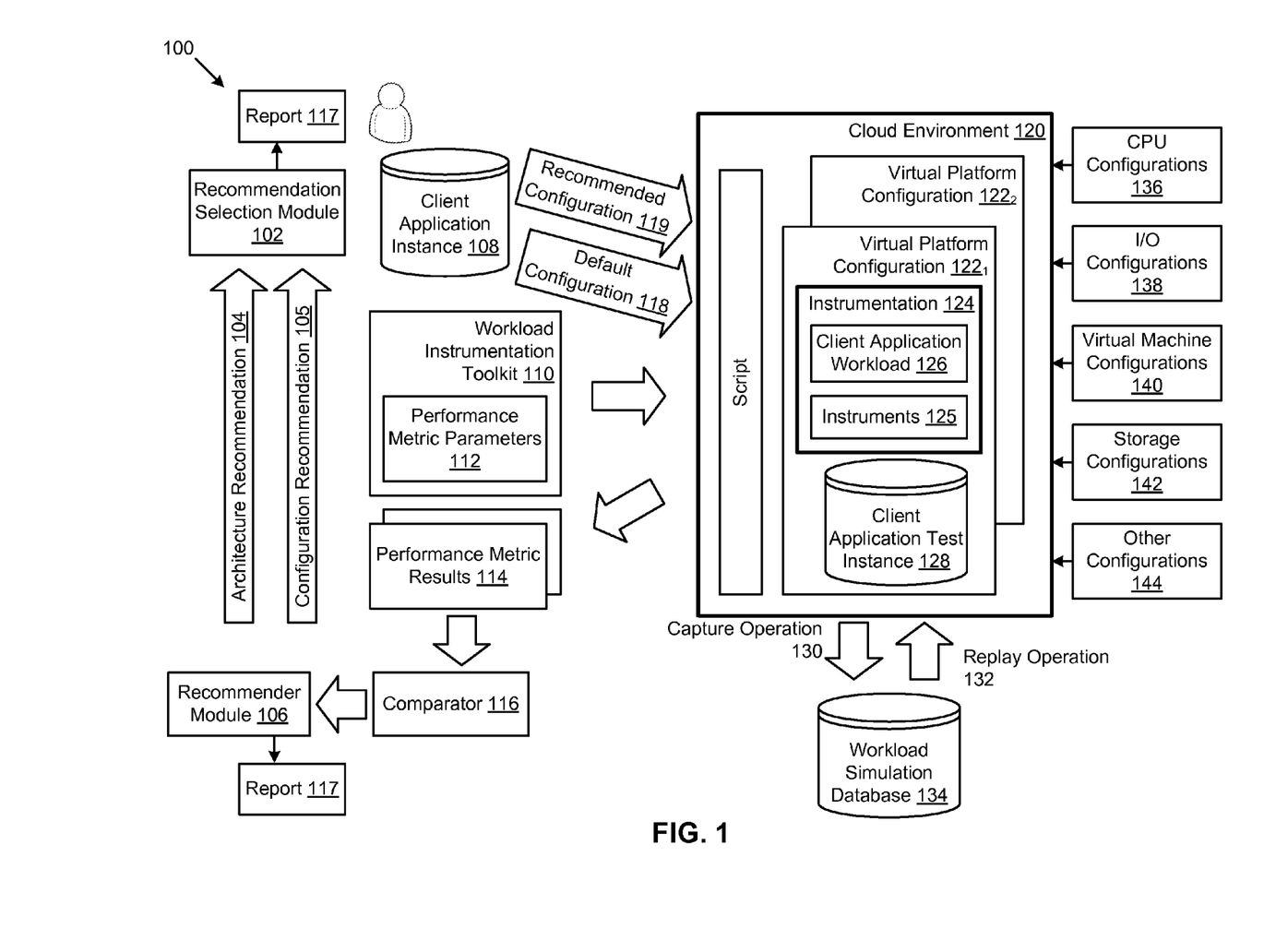
FIG. 1 is a block diagram system for recommending alternative cloud architectures using automated workload instrumentation, according to some embodiments.

FIG. 1 is a block diagram of a system 100 for recommending alternative cloud architectures using automated workload instrumentation. As an option, the present system 100 may be implemented in the context of the architecture and functionality of the embodiments described herein. Also, the system 100 or any aspect therein may be implemented in any desired environment.

As shown, system 100 for recommending alternative cloud architectures includes a cloud environment 120 which is configured by various configuration settings (e.g., CPU configurations 136, I/O configurations 138, virtual machine configurations 140, storage configurations 142, and other configurations 144). The cloud environment 120 can support a plurality of virtual platform configurations (e.g., virtual platform configuration $122_1$, virtual platform configuration $122_2$, etc.), and a client application (e.g., a client application test instance 128, a virtual machine, etc.) which can run within a particular virtual platform configuration.

As is understood by those skilled in the art, a client application instance 108 can be prepared outside of the cloud environment, and can be uploaded to the cloud environment together with a particular configuration specification. As earlier indicated, the particular configuration specification might be client-specified, or might be specified by the cloud services vendor, or might merely be a random or near-random configuration specification. Accordingly, the performance and/or utilization of the resources in the configuration by the application might be acceptable, or it might not. Regardless, application of the techniques disclosed herein serve to measure performance and utilization and further, to make a recommendation of alternative architectures and/or configurations.

In one embodiment:

An automated script and/or a computer-aided process can monitor the architecture of the system deployed on the cloud in order to track the resource utilization, application performance, operational health, and peak traffic.

An analyzer (e.g., recommender module 106 or recommendation selection module 102) can identify peak usage and/or peak traffic times, and can generate a report 117 to indicate what aspects of the system are being over utilized or underutilized. Such tracking and analysis can include known-in-the art computing metrics such as database request counts, I/O latency, CPU utilization patterns, memory usage patterns, transaction volumes, error rates, etc.

Based on the results of the analysis, areas where the system are deemed to be under performing can become the subject of further analysis and recommendations to the client, the recommendations comprising one or more proposed architectures and/or corresponding configurations. The client's personnel (e.g., a cloud architect) can re-deploy the application (e.g., from the client application instance 108) destined for the proposed architecture, and with a recommended configuration specification (e.g., in the form of a recommended configuration 119). In some cases the client's personnel (e.g., a cloud architect) might want to merely evaluate using a test instance (e.g., client application test instance 128).

As a service, the cloud vendor might assign its own QA team to stress test and/or perform regression tests using the client application test instance 128. Performance of such testing instances might lead to discovery of additional bottlenecks and/or areas subject to optimization by additional configuration fine-tuning.

The above scenario can be fully or partially automated as depicted. Strictly as one example, a script designed to result in a recommended configuration 119 might upload a client application instance 108, together with its default configuration 118 and host the client application as a client application test instance 128. The script might determine aspects of the workload (e.g., network traffic, storage requirements, transaction rates, etc.). In some cases, a client application workload 126 might be dominated by operations originating from within the cloud environment (e.g., in the case of a report generator application) or, a client application workload 126 might be dominated by operations originating from outside the cloud environment (e.g., in the case of a virus scan application). Regardless, and as shown, a client application test instance has its associated instance of client application workload 126, which workload can be captured (see capture operation 130), replayed (see replay operation 132), and optionally stored as a workload simulation database 134.

Continuing with the operations of the aforementioned script, such a script might access a workload instrumentation toolkit 110 and constituent performance metric parameters 112 to configure the instrumentation 124 around the client application workload 126. Then, the client application test instance 128 can be run using the client application workload 126, and the characteristics of the in-situ execution of the application can be captured by the instrumentation 124. The instrumentation 124 can be implemented as a layer or a wrapper around a client application workload 126, and can comprise any number of measurement instruments 125, which measurement instruments can be formed of software-based instances of measurement instruments, or hardware-based instances of measurement instruments, or both. The embodiment of system 100 is merely one example, and other embodiments are possible. In particular, the instrumentation 124 may be distributed throughout the system, and the measurement instruments 125 can be placed so as to measure any of a variety of internal performance parameters, system inputs and outputs, external performance parameters, and/or any selection or combination of pre-determined performance parameters.

Such a script can further cause any number of performance metric results 114 to be stored for possible further analysis. Indeed, as is noted in the following paragraphs, the act of instrumenting the application and capturing performance metric results can be performed repeatedly for a plurality of possible configurations. Then, having performance metric results for a plurality of possible configurations, any number of performance metric results 114 can be analyzed by a comparator 116, the results of which analysis can be codified for user access by a recommender module 106. The recommender module 106 might make a specific architecture recommendation 104 together with a specific configuration recommendation 105. A user can then consider the recommendations, possibly using a recommendation selection module 102 to select (or reject) any or all parts of either the specific architecture recommendation 104 and/or the specific configuration recommendation 105.

Figure 2:
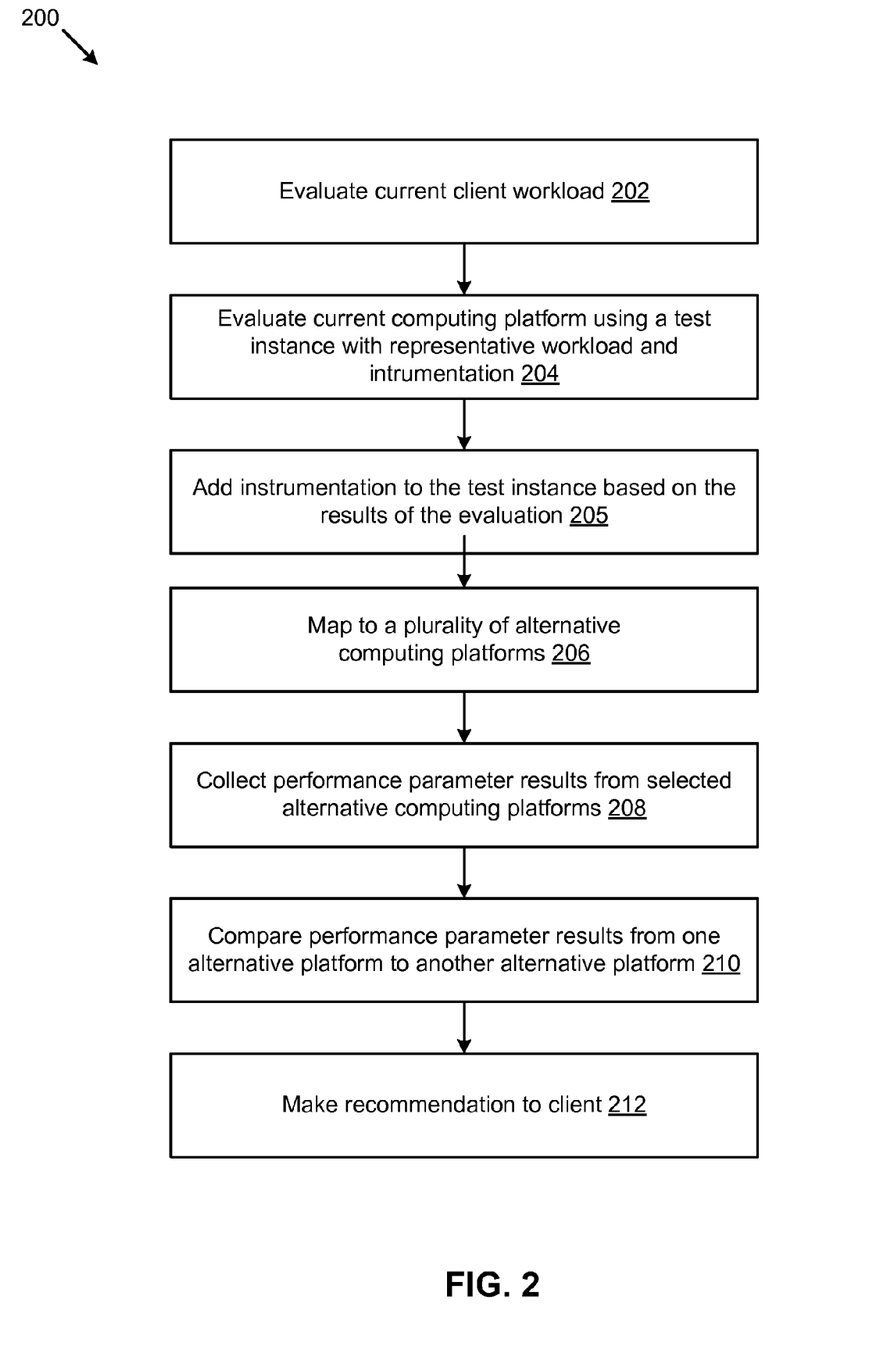
FIG. 2 is a flow chart of a system for recommending alternative cloud architectures using automated workload instrumentation, according to some embodiments.

FIG. 2 is a flow chart of a system 200 for recommending alternative cloud architectures using automated workload instrumentation. As an option, the present system 200 may be implemented in the context of the architecture and functionality of the embodiments described herein. Also, the system 200 or any aspect therein may be implemented in any desired environment.

The flow of system 200 commences by evaluating a client workload (see operation 202). For example, a cloud vendor might record performance metric results, and/or a time series of performance metric parameters for the application as deployed on one of several possible architectures within the cloud vendor's infrastructure, and then compare it with the same application deployed on a different one of the several possible architectures within the cloud vendor's infrastructure. Thus, having commonly instrumented the performance metric parameters for the deployed application, and having run it with the same workload and instrumentation, then the comparisons of the performance metric results would indicate performance metric differences between the two architectures. Such an analysis (e.g., of the differences in the performance parameter results that are being compared) can suggest which of the two candidate architectures might provide a more robust environment and/or which architecture performs better given the application and workload.

Such an analysis can be performed quantitatively. For example, consider performance parameters $P(1) \ldots P(n)$ to be the performance parameters that need to be compared, and $P_A(1) \ldots P_A(n)$, and $P_B(1) \ldots P_B(n)$ to be the actual values of the parameters as recorded by system "A" and system "B". Strictly as an example, system A might comprise a Linux™ platform, and system B might comprise a Windows™ platform. Comparing the various quantitative values of parameters $P(1) \ldots P(n)$, (for example, comparing $P_A(1)$ to the value of $P_B(1)$) might suggest better performance in the aspect of the "P(1)" parameter.

Adding the notion of an objective function, two or more architectures can be compared, and the architecture having the most favorable value of the objective function is the best of the ones compared.

In one embodiment, the results of the foregoing analysis can be used to compile a report, and the report can be delivered to the customer, recommending the architecture that had the best results. The report can further include the specific results from the test instance that was used to form the recommendation.

Now, system 200 carries out a series of steps beginning at evaluating a client workload (see operation 202) and ending by making a recommendation to the client (see operation 212). In order to make such a recommendation—based on quantitative analysis—the test instance is first run on a first computing platform using a test instance with representative workload and instrumentation (see operation 204). Then, based on the performance results using that computing platform, add additional instrumentation to the test instance based on the results of the evaluation (see operation 205). Based on the evaluations (e.g., from operation 204, or from operation 205) a plurality of alternative computing platforms are considered as alternatives (see operation 206). For example, if the performance results as captured by using the first computing platform exhibits compute-bound behaviors, then one or more high-performance computing architecture alternatives might be included in the plurality of alternative computing platforms. The test instance is again run on the alternative computing platforms in order to collect performance parameter results (see operation 208). Having quantitative values in the form of performance parameter results, then system 200 serves to compare performance parameter results from one alternative platform to performance parameter results from another alternative platform (see operation 210).

Figure 3:
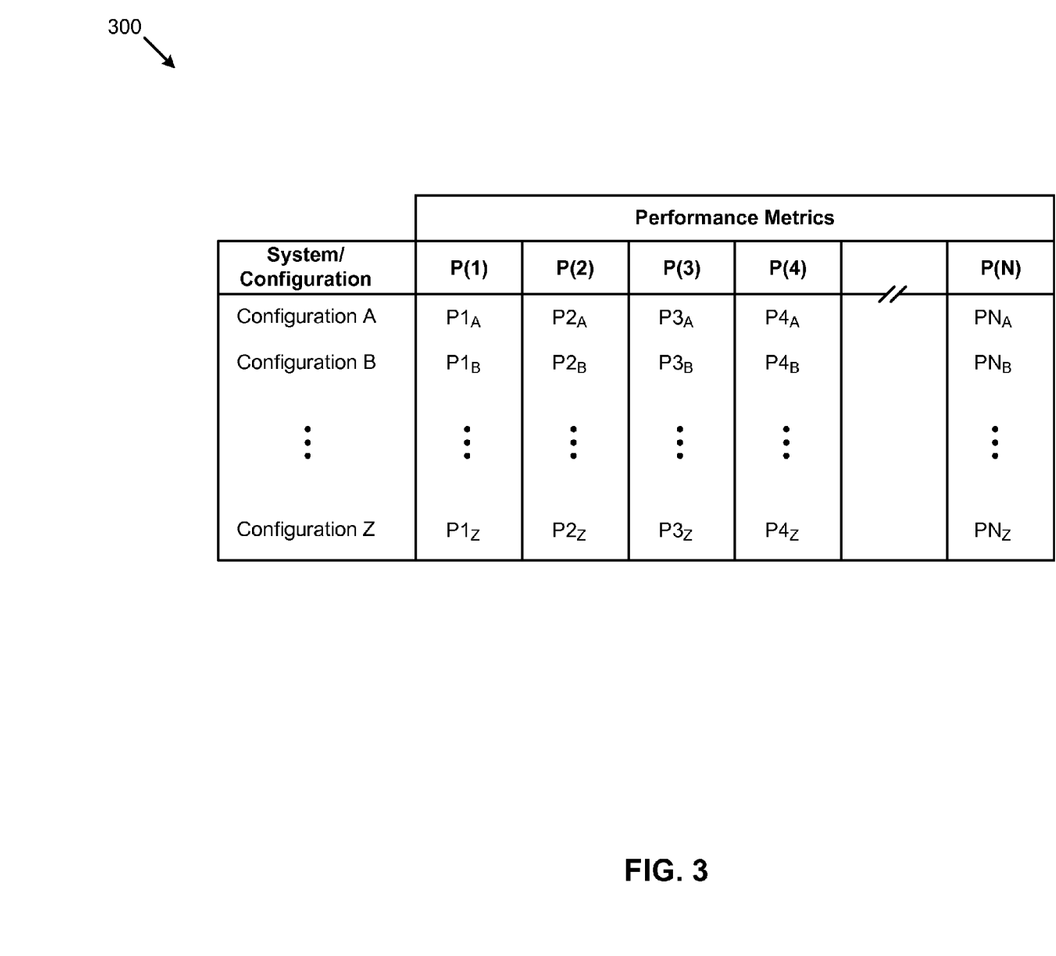
FIG. 3 is an exemplary depiction of an evaluation matrix used for recommending alternative cloud architectures using automated workload instrumentation, according to some embodiments.

FIG. 3 is an example depiction of an evaluation matrix 300 used for recommending alternative cloud architectures using automated workload instrumentation. As an option, the present evaluation matrix 300 may be implemented in the context of the architecture and functionality of the embodiments described herein. Also, the evaluation matrix 300 or any aspect therein may be implemented in any desired environment.

As shown, the table compares a series of performance parameters as were captured by instrumentation while running on a particular system and/or configuration.

As an illustrative discussion of the shown example, consider a response time parameter P(1), a memory usage parameter P(2), a CPU utilization parameter P(3), a latency parameter P(4), and other parameters P(N) to be the parameters that are being tracked for different applications deployed on a particular configuration hosted on cloud infrastructure. Now, consider running the applications on the cloud infrastructure having specific systems, and/or architectures, and/or configurations that are denoted by the letter references "A", and "B" and so on. Further consider architecture A to have two database servers and one middle tier, while architecture B has one database server and two middle tiers, and architecture C has one database server, one middle tier, and one network I/O accelerator card.

Such comparisons are depicted in FIG. 3. Yet still more comparative analysis can be performed using the aforementioned quantitative techniques. For example, applications performing similar functions that are embodied in different applications (e.g., possibly from different vendors) can be compared.

Considering three applications, namely "Application X", "Application Y", and "Application Z", their respective performance parameter results can be captured and compared. The table below shows how each application performs if they were to be deployed on the three proposed architectures. In the organization as per Table 1, a particular application (e.g., Application X) can be contrasted vis-à-vis differing architectures (e.g., Architecture A, Architecture B, etc.) over several parameters (e.g., P(1), P(2), etc.). For example, Application X exhibits a greatly reduced response time when deployed on Architecture C as compared with Architecture B (e.g., see the three slash-separated values in the top-left cell of data). Such numeric values across the proposed architectures can be used in an objective function for purposes of comparison or optimization to a particular objective function.

TABLE 1

| | Configuration | | | |
|---|---|---|---|---|
| Parameters | Response Time P(1) (ms) | Memory Usage (%) P(2) | CPU Utilization (%) P(3) | Latency P(4) (ms) |
| Application X values for Architecture A, Proposed B, Proposed C | 12/19/6 | 50/60/20 | 39/40/33 | 16/32/15 |
| Application: Y values for Proposed A, Architecture B, Proposed C | 14/12/14 | 60/45/45 | 50/33/23 | 12/12/7 |//

TABLE 1-continued

| | Configuration | | | |
|---|---|---|---|---|
| Parameters | Response Time P(1) (ms) | Memory Usage (%) P(2) | CPU Utilization (%) P(3) | Latency P(4) (ms) |
| Application: Z values for Proposed A, Proposed B, Architecture C | 16/14/7 | 60/55/30 | 40/45/24 | 15/19/4 |

Such numeric values can be compared against expectations or norms, and overage or underage can be determined. For example, a comparison of a numeric value of CPU Utilization P(3) against expectations can indicate over-utilization or under-utilization.

Strictly as an example, an objective function can be formed to represent performance as a scalar value, and such a scalar value can be presented on an X-Y plot for performing tradeoffs and cost-benefit analysis.

Figure 4:
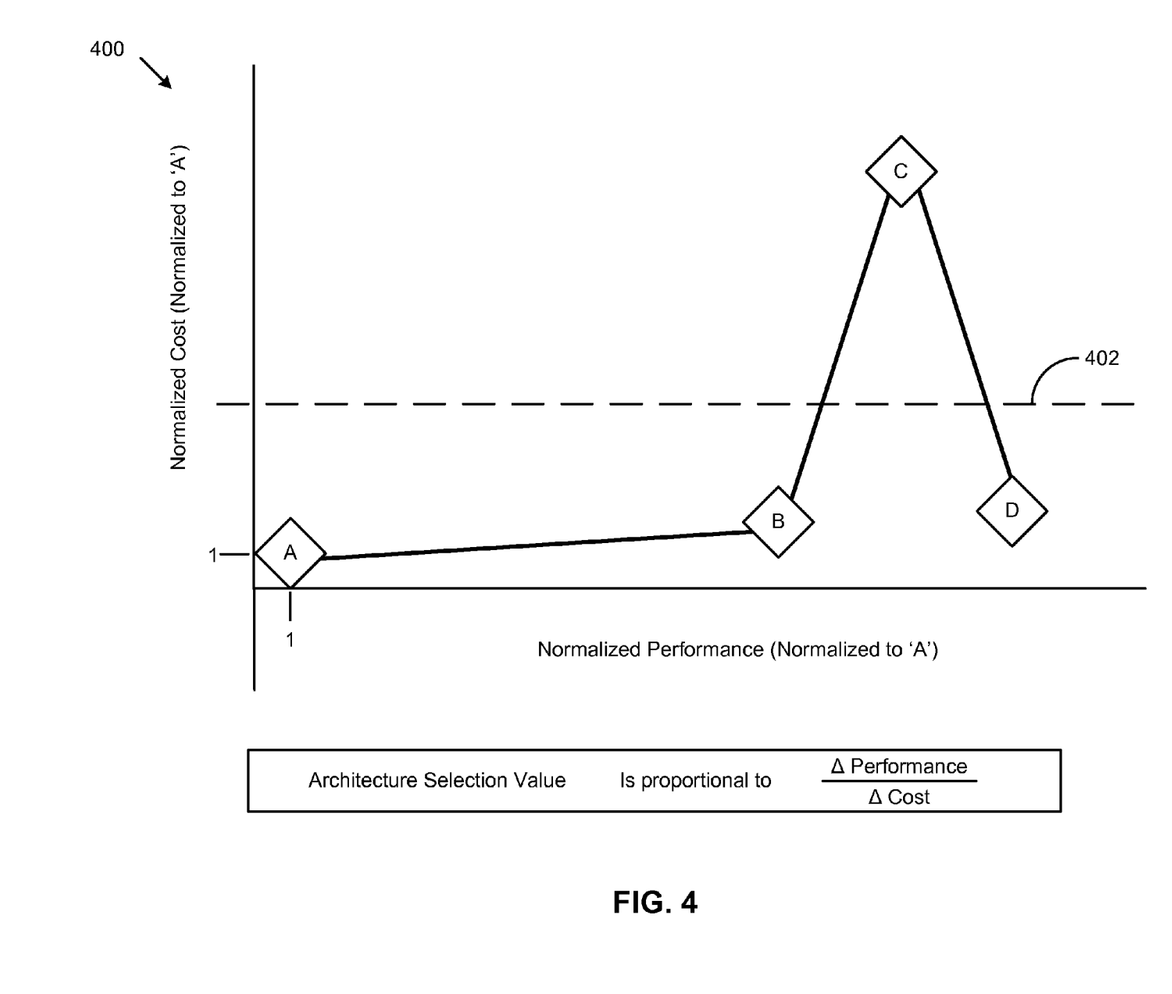
FIG. 4 is a cost-performance tradeoff chart for recommending alternative cloud architectures using automated workload instrumentation, according to some embodiments.

FIG. 4 is a cost-performance tradeoff chart 400 for recommending alternative cloud architectures using automated workload instrumentation. As an option, the present chart 400 may be implemented in the context of the architecture and functionality of the embodiments described herein. Also, the chart 400 or any aspect therein may be implemented in any desired environment.

As indicated in the discussion of FIG. 3, an objective function can be formed to represent performance as a scalar value, although such an objective function may include considerations beyond the quantitative metrics presented herein. A reasonable objective function can nonetheless be formed strictly on the basis of the herein-presented parameters. One possible objective function calculates a scalar value from a vector by comparing each pair of corresponding parameters to calculate a difference value, and then sums the difference values to obtain a scalar value. For example: ScalarValue=(PX(1)−PY(1)+(PX(2)−PX(2)). Such scalar values can calculated for comparison against a reference (e.g., normalized) architecture, and the scalar values can be plotted on a line, or on an X-Y plot against a second variable, or even in a three-dimensional or even N-dimensional depiction for comparison. Other techniques can be used in order to combine a vector of performance measurements into a scalar value, and other techniques, including techniques for normalizing a set of scalars, can be used to compare a scalar value based on a first set of second performance measurements to a scalar value based on a second set of performance measurements.

As shown in FIG. 3, scalar values are normalized to a reference architecture for performing tradeoffs and cost-benefit analysis. In the case shown, architecture A is normalized for performance as well as normalized for cost in preparation for presenting on the shown X-Y plot. Accordingly, the normalized architecture A is plotted at point (1, 1), as shown. Plotting normalized values for architectures B, and C, and D then leads to the chart of FIG. 4.

Analysis of the chart of FIG. 4 can proceed as follows: Given a current architecture shown as normalized (to point 1, 1), then moving to architecture B would significantly increase performance (relative to A) but with only a small increment in cost. Moving to architecture C would still further increase performance, but at a significant premium in cost. And, as shown, moving to architecture D would still further enhance performance with only a small increase in cost.

The cloud vendor might advise the client of such a situation, and might seamlessly deploy the client's application onto architecture B or architecture D. Other scenarios are possible and envisioned, including making a recommendation (or performing a seamless re-deployment) based on considerations as may be introduced as a consequence of service level agreements, and/or security restrictions, and/or a cost threshold 402.

At least some of the processes of porting a particular client's application to a recommended architecture can be automated using scripts or other sequencing techniques. Such a sequence is discussed in FIG. 5.

Figure 5:
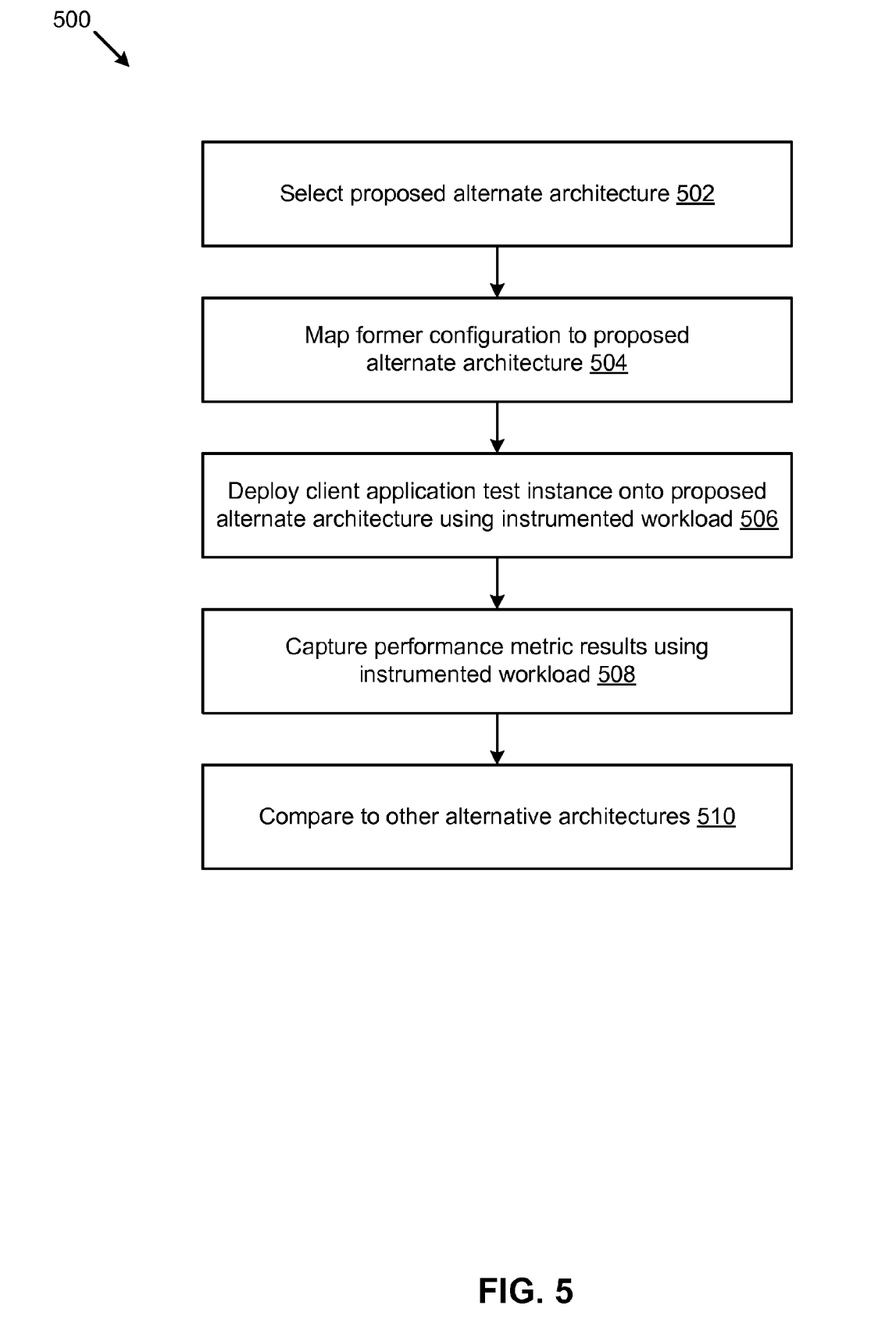
FIG. 5 is a flow chart of a system for ratifying a selected alternative cloud architecture, according to some embodiments.

FIG. 5 is a flow chart of a system 500 for ratifying a selected alternative cloud architecture. As an option, the present system 500 may be implemented in the context of the architecture and functionality of the embodiments described herein. Also, the system 500 or any aspect therein may be implemented in any desired environment.

Cloud-deployed applications change over time, and workloads change over time, thus a selected architecture can be periodically be re-evaluated as follows:

Consider time-variant changes in the application, and consider time-variant changes in the workload. Select one or more alternative architectures to be considered and contrasted with the current architecture (see operation 502). In some cases, a time-variant change in the workload can be used to select one or more alternative architectures. For example, if a time-variant change in the workload comprises a significant increase in (for example) Ethernet traffic, then an alternative architecture specifying multiple or additional Ethernet ports might be selected.

Configure a system which has the same component configuration as the current architecture. For example, if the current architecture has one database server and two middle tiers (e.g., two instances of a WebLogic Server™), then a machine corresponding to an alternative architecture will be set up to have one database server, and two middle tier servers installed on it. Other mappings are possible (see operation 504).

Deploy the current cloud-deployed application onto the newly configured machine, then instrument the application (see the aforementioned operation 208) and monitor the instrumented parameters. In exemplary cases, the instrumented application is executed using simulated traffic that is similar to traffic as was measured during a period while running the current cloud-deployed application on the original server. In some such cases, the workload is instrumented in addition to any application-specific performance parameters (see operation 506).

Capture the performance metrics using the instrumented workload or application (see operation 508). In exemplary cases, additional performance parameters may be instrumented in the workload or application based at least in part on the aforementioned captured performance metrics. For example, if a particular first performance metric is deemed to be a bottleneck (e.g., database I/O), then additional performance parameters (e.g., number of tables open, size of join operations, etc.) may be instrumented. Then, the performance metrics can be captured anew using the additional instruments (e.g., for the additional performance parameters). The performance metrics can be captured anew using the additional instruments on both the current architecture and on a particular proposed architecture.

The results of both the current architecture and a particular proposed architecture (e.g., on the newly configured machine) can be compared (see operation 510, and see FIG. 4) and any results compiled can be sent (e.g., as an email or other report) to the client, and possibly stating why the proposed configuration is 'better' and by how much. Thus, the client can make an informed decision as to whether the client wants to port the application to the new configuration (e.g., even in the face of possibly increased costs).

Still more improvement recommendations and deployment fine-tuning can be achieved by applying the techniques herein. For example, a client (e.g., Company A) deploying an application on a cloud server can be analyzed by a cloud vendor vis-à-vis various performance metrics and then compared against empirical data that it has collected for similar applications that were deployed on the cloud vendor's servers. This comparison can give the client an insight into how its application is performing and what aspects need to be addressed (e.g., changed, improved, swapped-out, etc.) in order to enhance the cost/benefit quotient of their system. Further, empirical validation can be substantiated by the facts (if present) that other applications have used a certain architecture on a particular technology stack, and which are performing better.

In some cases, a cloud vendor establishes a set of rules that would pre-qualify a particular architecture or configuration as a 'good' or candidate architecture. Such rules can serve as a baseline for collecting seed data for further application analysis.

In addition to the aforementioned automated porting, a cloud vendor might instrument and monitor applications in-situ. Strictly as an example, a cloud vendor might monitor and propose the following:

Defragmentation: Defragment pods/hosts/VMs to free up unused resources.

Disk Space Utilization Assessment: The cloud vendor can monitor the disk space periodically (e.g., once every two weeks) and report usage to the client.

Performance Thresholding: The cloud vendor might deploy the client's application on an alternate candidate platform to check if there is an improvement (e.g., above a particular threshold, such as 1.5×) in the performance of the application. If so, the cloud vendor might implement additional instrumentation, perform one or more test instance deployments, and perform additional measurements. Strictly as an example, a web application running on a Windows™ operating system might be ported to a Linux machine and a detailed analysis based on measured response times, memory usages, and/or other performance metrics can be presented to the client, suggesting to them alternative configurations for improved performance.

Off-peak Scheduling: Propose a time-based configuration. For example, there are some tasks or workloads that the client needs to run on the cloud periodically (e.g., once a week), but for which the specific timing (e.g., mornings, middle of the night, etc.) of the performance of the task does not impact any critical functions. Thus, the cloud vendor can offer promotions and other such offers to suggest that the client schedule runs of their tasks, for instance, at off-peak hours, thereby using certain otherwise unused resources, while still meeting the needs of the customer, and possibly at a lower cost.

Enable a Secondary Marketplace: Provide fragmented or under-utilized resources at an auction. Aspects of access to resources at an auction can include benefits to both the cloud vendor as well as the auction winner. As examples, the cloud vendor might be able to deploy resources with the encumbrance of a service level agreement (SLA), and might receive immediate payments. The auction winner might achieve a lowered cost, and yet achieve completion of their job within a prescribed schedule.

Additional Embodiments of the Disclosure

Figure 6:
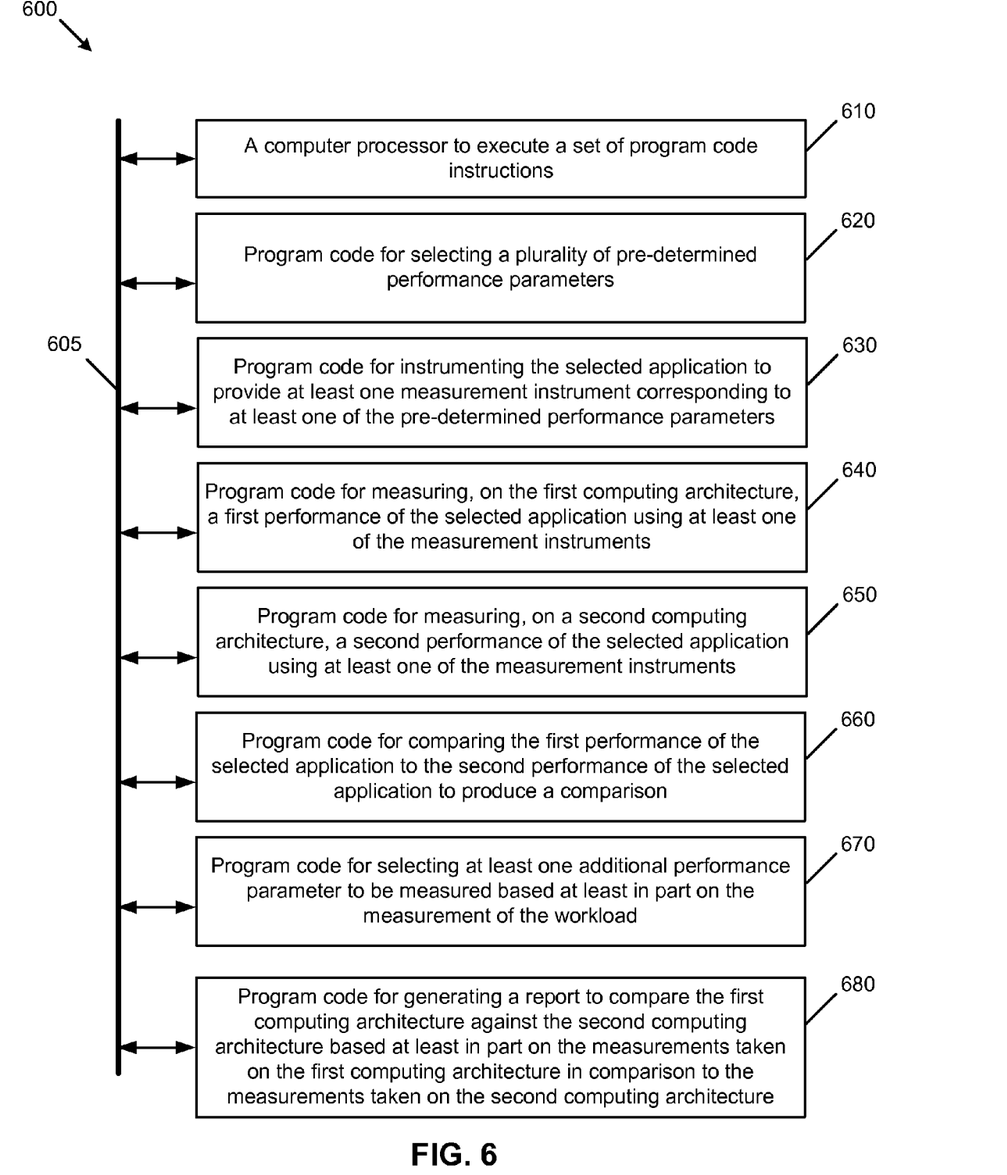
FIG. 6 depicts a block diagram of a system to perform certain functions of a computer system, according to some embodiments.

FIG. 6 depicts a block diagram of a system to perform certain functions of a computer system. As an option, the present system 600 may be implemented in the context of the architecture and functionality of the embodiments described herein. Of course, however, the system 600 or any operation therein may be carried out in any desired environment. As shown, system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The embodiment of FIG. 6 implements a portion of a computer system, shown as system 600, comprising a computer processor to execute a set of program code instructions (see module 610) and modules for accessing memory to hold program code instructions to recommend alternative computing architectures for a selected application using automated workload instrumentation. Program code implements: selecting a plurality of pre-determined performance parameters (see module 620); instrumenting the selected application (e.g., a software application, a virtual machine, a software application and a virtual machine in combination, etc.) to provide at least one measurement instrument corresponding to at least one of the pre-determined performance parameters (see module 630); measuring, on the first computing architecture, a first performance of the selected application using at least one of the measurement instruments (see module 640); measuring, on a second computing architecture, a second performance of the selected application using at least one of the measurement instruments (see module 650); comparing, by a computer, the first performance of the selected application to the second performance of the selected application to produce a comparison (see module 660); then selecting at least one additional performance parameter to be measured based at least in part on the measurement of the workload (see module 670); and generating a report to compare the first computing architecture against the second computing architecture based at least in part on the measurements taken on the first computing architecture in comparison to the measurements taken on the second computing architecture (see module 680).

Some embodiments further comprising using a computer to generate a report to indicate over-utilization or under-utilization of any particular resource, possibly using a comparison against norms. Furthermore, the act of selecting the aforementioned at least one additional performance parameter can be based on a heuristic. For example, if a network interface is deemed to be over-utilized, then a heuristic might indicate to select additional performance parameters related to networking (e.g., packet latency, aggregate bandwidth, etc.).

System Architecture Overview

Figure 7:
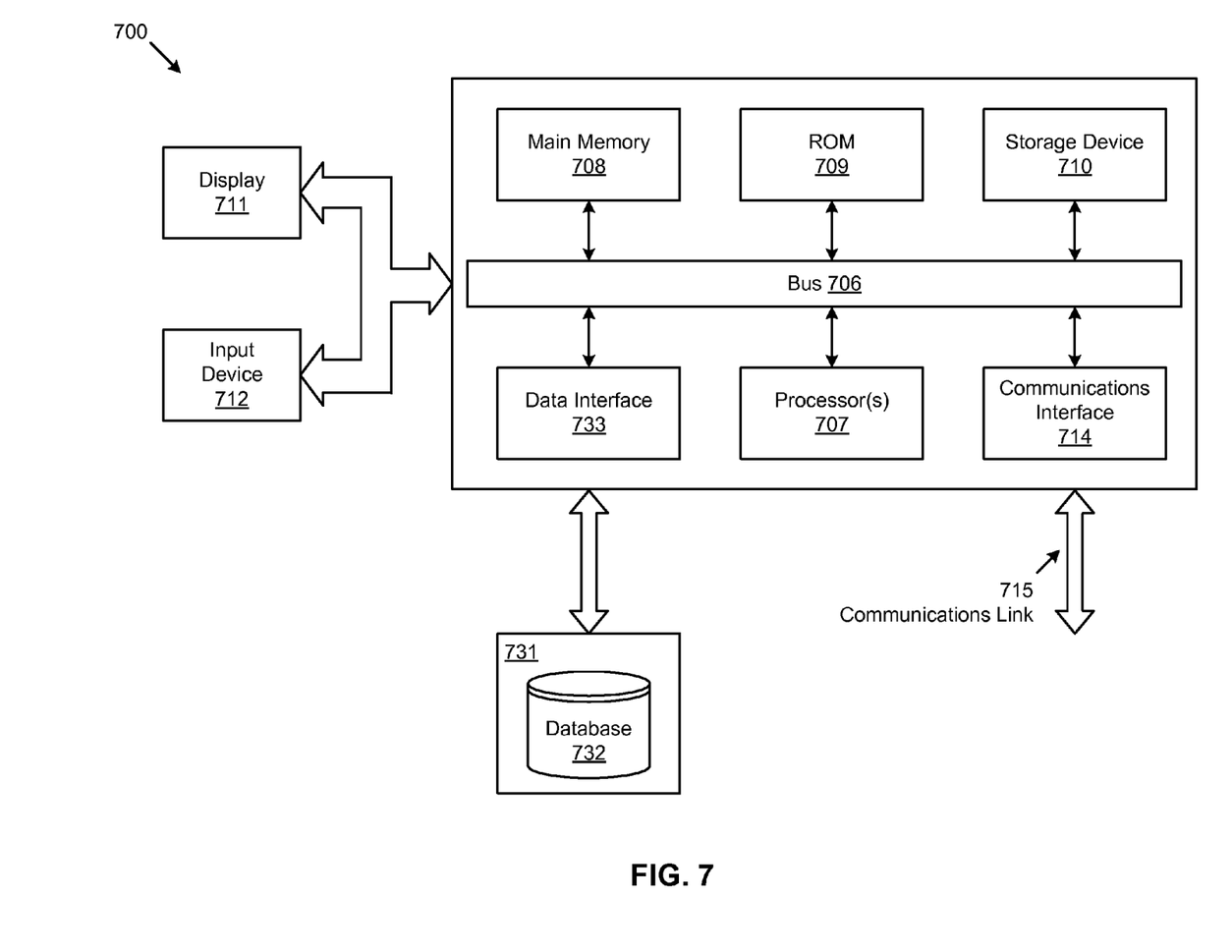
FIG. 7 depicts a block diagram of an instance of a computer system suitable for implementing an embodiment of the present disclosure.

FIG. 7 depicts a block diagram of an instance of a computer system 700 suitable for implementing an embodiment of the present disclosure. Computer system 700 includes a bus 706 or other communication mechanism for communicating information, which interconnects subsystems and devices, such as a processor 707, a system memory 708 (e.g., RAM), a static storage device (e.g., ROM 709), a disk drive 710 (e.g., magnetic or optical), a data interface 733, a communication interface 714 (e.g., modem or Ethernet card), a display 711 (e.g., CRT or LCD), input devices 712 (e.g., keyboard, cursor control), and an external data repository 731.

According to one embodiment of the disclosure, computer system 700 performs specific operations by processor 707 executing one or more sequences of one or more instructions contained in system memory 708. Such instructions may be read into system memory 708 from another computer readable/usable medium, such as a static storage device or a disk drive 710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 700. According to certain embodiments of the disclosure, two or more computer systems 700 coupled by a communications link 715 (e.g., LAN, PTSN, or wireless network) may perform the sequence of instructions required to practice the disclosure in coordination with one another.

Computer system 700 may transmit and receive messages, data, and instructions, including programs (e.g., application code), through communications link 715 and communication interface 714. Received program code may be executed by processor 707 as it is received, and/or stored in disk drive 710 or other non-volatile storage for later execution. Computer system 700 may communicate through a data interface 733 to a database 732 on an external data repository 731. A module as used herein can be implemented using any mix of any portions of the system memory 708, and any extent of hard-wired circuitry including hard-wired circuitry embodied as a processor 707.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for recommending alternative computing architectures for a selected application using automated workload instrumentation, the method comprising:
   selecting a plurality of performance parameters;
   implementing instruments to gather data on the selected application to provide at least one measurement instrument corresponding to at least one of the performance parameters;
   measuring, on a first computing architecture, a first performance of the selected application when processing a workload using at least one measurement instrument;
   measuring, on a second computing architecture, a second performance of the selected application when processing the workload processed by the selected application on the first computing architecture using the at least one measurement instrument;
   comparing, by a computer, the first performance of the selected application to the second performance of the selected application to produce a comparison; and
   selecting, by a computer, at least one additional performance parameter to be measured by:
      reviewing the measurements of the at least one measurement instrument of the workload; and
      selecting the at least one additional performance parameter to be measured based at least in part on a result of the review of the measurements.

2. The method of claim 1, further comprising:
   implementing instruments to gather data on the selected application to provide at least one second measurement instrument corresponding to the at least one additional performance parameter;
   measuring, on the first computing architecture, a third performance of the selected application when processing the workload using the at least one second measurement instrument;
   measuring, on the second computing architecture, a fourth performance of the selected application when processing the workload processed by the selected application on the first computing architecture using the at least one second measurement instrument;
   comparing, by a computer, the third performance of the selected application to the fourth performance of the selected application to produce a comparison;
   generating, by a computer, a report comparing the first computing architecture against the second computing architecture based at least in part on the measurements taken on the first computing architecture in comparison to the measurements taken on the second computing architecture, wherein the measurements include at least in part on the at least one additional performance parameter; and
   mapping, by a computer, a plurality of alternative computing architectures based at least in part on the measurements of the at least one second measurement instrument of the workload.

3. The method of claim 1, further comprising using a computer to generate a report to compare the first computing architecture against the second computing architecture based at least in part on the measurements taken on the first computing architecture in comparison to the measurements taken on the second computing architecture.

4. The method of claim 1, wherein the second computing architecture is determined based at least in part on the at least one of the performance parameter.

5. The method of claim 1, further comprising combining first measurements of the first performance into a first scalar value, and combining second measurements of the second performance into a second scalar value.

6. The method of claim 5, further comprising normalizing the second scalar value to the first scalar value.

7. The method of claim 5, further comprising comparing the first scalar value against a respective cost, and comparing the second scalar value against a respective cost.

8. The method of claim 1, wherein selecting the at least one additional performance parameter to be measured comprises:
   identifying, from the result of the measurements, a bottleneck of the selected application, wherein the bottleneck is a database I/O; and
   implementing instruments on the database I/O of the selected application to monitor a number of tables open.

9. A computer system for recommending alternative computing architectures for a selected application using automated workload instrumentation, comprising:
   a computer processor to execute a set of program code instructions; and
   a memory to hold the set of program code instructions, in which the set of program code instructions comprises program code to perform,
   selecting a plurality of performance parameters;
   implementing instruments to gather data on the selected application to provide at least one measurement instrument corresponding to at least one of the performance parameters;
   measuring, on a first computing architecture, a first performance of the selected application when processing a workload using the at least one measurement instrument;
   measuring, on a second computing architecture, a second performance of the selected application when processing the workload processed by the selected application on the first computing architecture using the at least one measurement instrument;
   comparing, by a computer, the first performance of the selected application to the second performance of the selected application to produce a comparison; and
   selecting, by a computer, at least one additional performance parameter to be measured by:
      reviewing the measurements of the at least one measurement instrument of the workload; and
      selecting the at least one additional performance parameter to be measured based at least in part on a result of the review of the measurements.

10. The computer system of claim 9, at the set of program code instructions comprises program code to further perform,
    implementing instruments to gather data on the selected application to provide at least one second measurement instrument corresponding to the at least one additional performance parameter;
    measuring, on the first computing architecture, a third performance of the selected application when processing the workload using the at least one second measurement instrument;

measuring, on the second computing architecture, a fourth performance of the selected application when processing the workload processed by the selected application on the first computing architecture using the at least one second measurement instrument;

comparing, by a computer, the third performance of the selected application to the fourth performance of the selected application to produce a comparison;

generating, by a computer, a report comparing the first computing architecture against the second computing architecture based at least in part on the measurements taken on the first computing architecture in comparison to the measurements taken on the second computing architecture, wherein the measurements include at least in part on the at least one additional performance parameter; and mapping, by a computer, a plurality of alternative computing architectures based at least in part on the measurements of the at least one second measurement instrument of the workload.

11. The computer system of claim 9, further comprising using a computer to generate a report to compare the first computing architecture against the second computing architecture based at least in part on the measurements taken on the first computing architecture in comparison to the measurements taken on the second computing architecture.

12. The computer system of claim 9, wherein the second computing architecture is determined based at least in part on the at least one of the performance parameter.

13. The computer system of claim 9, further comprising combining first measurements of the first performance into a first scalar value, and combining second measurements of the second performance into a second scalar value.

14. The computer system of claim 13, further comprising normalizing the second scalar value to the first scalar value.

15. The computer system of claim 13, further comprising comparing the first scalar value against a respective cost, and comparing the second scalar value against a respective cost.

16. A computer program product embodied in a non-transitory computer readable medium, the non-transitory computer readable medium having stored thereon a sequence of instructions which, when executed by a processor causes the processor to execute a process for recommending alternative computing architectures for a selected application using automated workload instrumentation, the process comprising:

selecting a plurality of performance parameters;

implementing instruments to gather data on the selected application to provide at least one measurement instrument corresponding to at least one of the performance parameters;

measuring, on a first computing architecture, a first performance of the selected application when processing a workload using the at least one measurement instrument;

measuring, on a second computing architecture, a second performance of the selected application when processing the workload processed by the selected application on the first computing architecture using the at least one measurement instrument;

comparing, by a computer, the first performance of the selected application to the second performance of the selected application to produce a comparison; and selecting, by a computer, at least one additional performance parameter to be measured by:
reviewing the measurements of the at least one measurement instrument of the workload; and
selecting the at least one additional performance parameter to be measured based at least in part on a result of the review of the measurements.

17. The computer program product of claim 16, further comprising:

implementing instruments to gather data on the selected application to provide at least one second measurement instrument corresponding to the at least one additional performance parameter;

measuring, on the first computing architecture, a third performance of the selected application when processing the workload using the at least one second measurement instrument;

measuring, on the second computing architecture, a fourth performance of the selected application when processing the workload processed by the selected application on the first computing architecture using the at least one second measurement instrument;

comparing, by a computer, the third performance of the selected application to the fourth performance of the selected application to produce a comparison;

generating, by a computer, a report comparing the first computing architecture against the second computing architecture based at least in part on the measurements taken on the first computing architecture in comparison to the measurements taken on the second computing architecture, wherein the measurements include at least in part on the at least one additional performance parameter; and mapping, by a computer, a plurality of alternative computing architectures based at least in part on the measurements of the at least one second measurement instrument of the workload.

18. The computer program product of claim 16, further comprising using a computer to generate a report to compare the first computing architecture against the second computing architecture based at least in part on the measurements taken on the first computing architecture in comparison to the measurements taken on the second computing architecture.

19. The computer program product of claim 16, wherein the second computing architecture is determined based at least in part on the at least one of the performance parameter.

20. The computer program product of claim 16, further comprising combining first measurements of the first performance into a first scalar value, and combining second measurements of the second performance into a second scalar value.

21. The computer program product of claim 20, further comprising normalizing the second scalar value to the first scalar value.

* * * * *